(No Model.)
G. T. LEWIS.
PROCESS OF OBTAINING PRECIOUS METALS FROM REFRACTORY ORES.
No. 286,025. Patented Oct. 2, 1883.
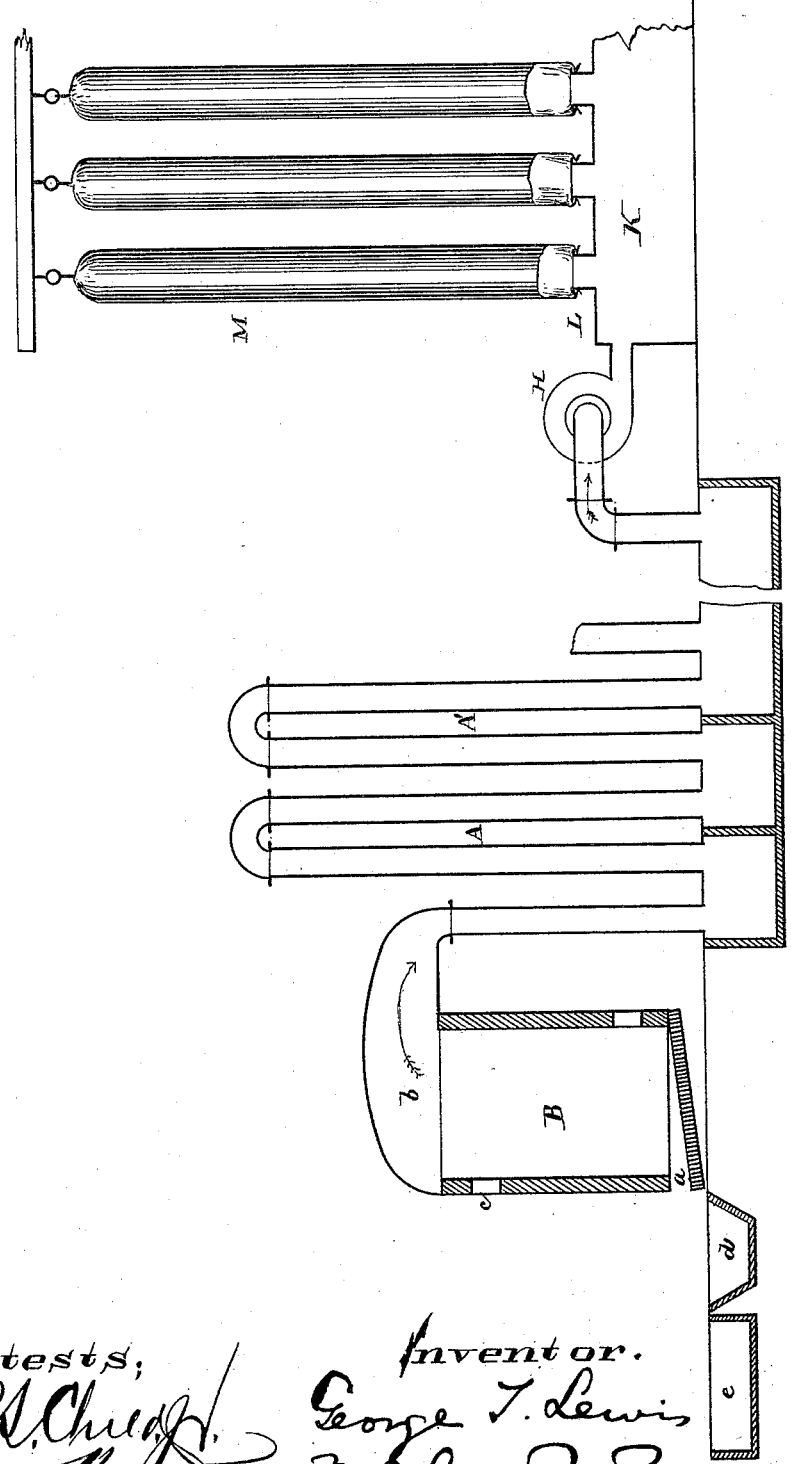

UNITED STATES PATENT OFFICE.

GEORGE T. LEWIS, OF PHILADELPHIA, PENNSYLVANIA.

PROCESS OF OBTAINING PRECIOUS METALS FROM REFRACTORY ORES.

SPECIFICATION forming part of Letters Patent No. 286,025, dated October 2, 1883.

Application filed December 6, 1882. (No model.)

*To all whom it may concern:*

Be it known that I, GEORGE T. LEWIS, of the city and county of Philadelphia, in the State of Pennsylvania, have invented a new and useful improvement in the process of obtaining the precious metals from refractory ores containing lead and zinc, very often antimony and arsenic and other base metals, besides a valuable quantity of silver and gold, together or singly, of which the following is a specification.

It has heretofore been impossible to smelt down such ore, as the large amount of silver, zinc, antimony, and arsenic at a low temperature will prevent the valuable metals from smelting down, and only a slag mass will be formed. If, on the other side, the temperature is raised sufficiently high, the bulk of the metals, instead of smelting down, will be carried off as fumes and escape into the stack or chimney. Large amounts of such refractory ore are found in various places. At Gunnison, Colorado, is thus found ore with as high as one hundred ounces of silver to the ton, which hitherto has been of no value at all. These ores at Gunnison consist of silicious rock, argentiferous lead, and zinc compounds, with oxygen, sulphur, arsenic, and antimony, and copper is often present, mostly as copper pyrites. Experiments have been made with this Gunnison ore, and it was found that it could only be smelted by exposure to an intense heat produced in a blast-furnace, and in that case a very large proportion of the base metals, as well as of the silver, escaped through the chimney. I have discovered that by using, with the stack or chimney of a low cupola blast-furnace or a similar blast-furnace where an intense heat is produced, bags of woolen or other textile material, a large percentage of the metals will be driven up the chimney and caught in the fibrous material of the bags, while the gases pass out through the interstices of the bags. Between the bags and the furnace I interpose a series of cooling-flues. The material caught—by settling in cooling pipes, flues, and the strainers, and by filtration—in the bags will contain the valuable metals separated from the silicious rock, and can be worked up, either by dry or wet process, for the production of the metals it contains.

I am aware that bags of textile fabrics or other material have been heretofore combined with furnaces for the purpose of preventing the loss of waste evolved in the escaping fumes. The present process differs from the former in this, that a much higher heat and blast are used in the smelting-furnace to cause a large percentage of the metallic products to pass up the chimney and be caught in the bags, and this material thus collected, being freed from silicious rock and other gangue, may be treated as other non-refractory ore is treated, either by smelting down, or the metallic compounds may be separated by the wet process. I do not therefore desire to claim herein the combination of a smelting-furnace with bags of textile fabric, but merely the process of working refractory ore to obtain the metallic products, as above described.

I carry on my process in the following manner: I employ a low cupola blast-furnace, such as is used for smelting down lead-slag. In the drawing, B represents a low cupola-furnace with an opening, c, for the feeding of the furnace with ore and fuel, having a sloping bottom. Through a the metal and slag run out, and the metal stays in the box d, while the slag runs into the water-box e. The crushed ore is fed into the furnace with coke, charcoal, or anthracite coal. The fumes pass up, and by the fan-blower H are drawn through the hood b into the cooling-pipes A A', and after passing through the fan are blown into the sheet-iron bin K, where the solid fumes are collected, while the gases pass out through the interstices of the bags M, fastened to the collars L on the bin K. The material settled in the pipes A A' and condensed in the bags M and bin K will contain a great part of the lead, silver, and gold of the ore, together with part of the zinc, arsenic, and antimony, &c. The material thus collected may be treated by the wet process in order to separate from the lead, silver, and gold, some or all of the other metallic compounds, or it may be resmelted down to a bullion of argentiferous and auriferous lead, and in this the lead may again be separated from the precious metal or metals in the well-known way.

Having thus described my process, I claim—

1. The reduction of refractory gold and silver bearing ores by volatilizing the metals in a cupola or slag eye furnace at a high heat, as described, and then collecting the same in bags of textile or similar fabric, and afterward treating the material thus collected to recover the precious metals, as set forth.

2. The reduction of refractory silver and gold bearing ores by smelting the metals in a suitable furnace with heat and blast, as described, to cause the metals to pass off in fumes, and then collecting the same in bags and afterward resmelting the material thus collected, as hereinbefore set forth.

GEORGE T. LEWIS.

Witnesses:
R. S. CHILD, Jr.,
JOSEPH NOLAN.